United States Patent [19]

Ohta

[11] Patent Number: 5,216,227
[45] Date of Patent: Jun. 1, 1993

[54] INDEX DISPLAYING DEVICE FOR A VIDEO DISK PLAYER

[75] Inventor: Yoshihiro Ohta, Kanagawa, Japan

[73] Assignee: Sony Corporation, Tokyo, Japan

[21] Appl. No.: 795,188

[22] Filed: Nov. 18, 1991

[30] Foreign Application Priority Data

Nov. 19, 1990 [JP] Japan ................. 2-311641

[51] Int. Cl.⁵ .............................. G09G 1/00
[52] U.S. Cl. ........................ 235/375; 235/381; 235/462; 235/470; 395/155
[58] Field of Search .............. 235/375, 381, 462, 470; 382/41; 395/155

[56] References Cited

U.S. PATENT DOCUMENTS 4,621,259 11/1986 Schepers et al. .............. 235/462
4,766,581 8/1988 Korn et al. .................... 235/381

Primary Examiner—William L. Sikes
Assistant Examiner—Scott A. Ouellette
Attorney, Agent, or Firm—Philip M. Shaw, Jr.

[57] ABSTRACT

An index displaying device for a video disk player is capable of discriminating between a command signal provided by operating the keys of a remote controller and a command signal provided by reading a bar code by the remote controller, and of omitting displaying unnecessary indices on the screen of a monitor when the command signal given thereto is produced by reading a bar code. The index displaying device comprises a signal receiver for receiving a signal transmitted by a remote controller, an index signal generating circuit that generates an index signal corresponding to the command signal received by the signal receiver to be displayed together with signals reproduced from the video disk, and a control circuit that decides if the signal received by the signal receiver is produced by reading a bar code and controls index displaying operation according to the result of the decision. Accordingly, no index is displayed on the monitor to avoid displaying unnecessary indices on the monitor when the command signal is produce by reading a bar code.

1 Claim, 6 Drawing Sheets

|  |  | DATA CODE (7) | CATEGORY CODE (5) |
|---|---|---|---|
| SEARCH | W | 0001110 | 00010 |
| 2 | X | 1000000 | 00010 |
| ENTER | Y | 0100110 | 00010 |
| PLAY | Z | 0101100 | 00010 |

|  |  | DATA CODE (7) | CATEGORY CODE (8) |
|---|---|---|---|
| START WORD | A | 0 0 0 0 0 0 1 | 0 0 1 0 0 1 0 0 |
| CHAPTER REPRODUCTION COMMAND | B | 1 0 1 0 1 0 1 | 0 0 1 0 1 0 0 0 |
| 2 | C | 1 0 0 0 0 0 0 | 0 0 1 0 1 0 0 0 |
| END WORD | D | 1 1 1 1 1 1 1 | 0 0 1 0 0 1 0 0 |

INDEX DISPLAYING DEVICE FOR A VIDEO DISK PLAYER

BACKGROUND OF THE INVENTION

1. Field of the Invention

The present invention relates to an index displaying device for a video disk player, to display an index indicating an operation being currently executed by the video disk player.

2. Description of the Prior Art

The video disk player is capable of accessing and reproducing in a comparatively short time a desired frame of image information among tens of thousands of frames of image information recorded in a video disk. To specify and reproduce desired image information by operating a remote controller or the like, the video disk player is provided with a chapter search function.

Referring to FIG. 7 showing an example of a remote controller for selecting the chapter search function, the remote controller is provided with a bar code reader 2 provided on one end of a case 1, and a read command key 3 provided near the bar code reader 2. The read command key 3 is pressed in reading a bar code by the bar code reader 2. An infrared signal transmitter 4, i.e., a remote control signal transmitter, is provided on the other end of the case 1. A transfer key 5 disposed near the infrared emitter 4 is pressed to transmit a command signal read by the bar code reader 2 from the infrared signal transmitter 4. A forward access key 6, a reverse access key 7, a forward step access key 8, a reverse step access key 9, a play key 10 for starting the video disk player, numeric keys 11, a search key 12 and an enter key 13 are arranged in the central portion of the case 1.

FIGS. 8(A), 8(B), 8(C) and 8(D) show indices displayed on the screen of a monitor when the remote controller is operated to actuate the chapter search function. When chapter search is desired in the play mode, the search key 12 is pressed. Then, an index "SEARCH C * 00" as shown in FIG. 8(A) is displayed in the upper portion of the screen of the monitor. If it is desired to reproduce Chapter 2, the numeric key "2" is pressed and the enter key 13 is pressed. Then, the index "SEARCH C * 00" is changed for an index "SEARCH C * 02" as shown in FIG. 8(B) and the video disk player starts making a search for a frame corresponding to Chapter 2. Upon the completion of the search for the frame corresponding to Chapter 2, a still image of a frame as shown in FIG. 8(C) corresponding to Chapter 2 is reproduced and displayed on the monitor and the index disappears. Then, the play key 10 provided on the case 1 is pressed to reproduce the image information of Chapter 2 in the play mode as shown in FIG. 8(D).

While the video disk player is in the searching operation, information corresponding to the pressed key of the remote controller is displayed on the screen to enable the operator to operate the video disk player, confirming the selected task.

The foregoing operation is an example of operating procedures employing an independent key input function to be executed by using the numeric keys 11 and the associated keys. The use of the independent key input function requires somewhat complex operation of the remote controller, which may be a trouble for an unexperienced operator. Accordingly, bar codes are employed in simplifying the operation of the remote controller to improve the accessibility of the remote controller.

To avoid complex operation of the remote controller in using the independent key input function, the accessibility of the remote controller is improved by employing bar codes.

A bar code for selecting, for example, "Chapter 2" is read by the bar code reader 2 with the read command key 3 pressed, and then the transfer key 5 is pressed to transmit a command signal corresponding to the bar code read by the bar code reader 2 by the infrared signal transmitter 4 to the video disk player. Thus, a series of command signals corresponding to the operating procedure employing the independent key input function, namely, search for Chapter 2 and subsequent starting operation in the play mode.

However, even if a series of command signals is transmitted to the video disk player by employing the bar code reading function, the video disk player executes a series of operations for displaying the indices shown in FIGS. 8(A) to 8(D), which is to be executed when the independent key input function is employed.

Particularly, in using the bar code reading function, the operator is required only to select a bar code representing a series of commands from a list of bar codes, and the indication of the indices as shown in FIGS. 8(A) to 8(D) on the screen of the monitor is unnecessary and, rather, an obstacle to the view.

SUMMARY OF THE INVENTION

The present invention has been made to solve the foregoing problems and it is therefore an object of the present invention to provide an index displaying device for a video disk player, capable of discriminating between a command signal provided by the independent key input function and a command signal provided by the bar code reading function, and of omitting displaying unnecessary indices on the screen of a monitor when command signal is provided by the bar code reading function.

To achieve the object, the present invention provides an index displaying device for a video disk player, comprising: a signal receiver for receiving a command signal transmitted by a remote controller, an index signal generating circuit that generates an index signal corresponding to the command signal received by the signal receiver to be displayed together with a signal reproduced from the video disk; and a control circuit that decides if the command signal received by the signal receiving unit is produced by reading a bar code, and controls index displaying operation according to the result of the decision.

The index displaying device for a video disk player, in accordance with the present invention decides if the signal transmitted by the remote controller is produced by reading a bar code, and stops superposing an index signal on the signal reproduced from the video disk when the signal transmitted by the remote controller is produced by reading the bar code.

Accordingly, when the remote controller is operated in a bar code reading mode, no index is displayed on the screen of the monitor to omit displaying unnecessary indices.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENT

Figure 1:
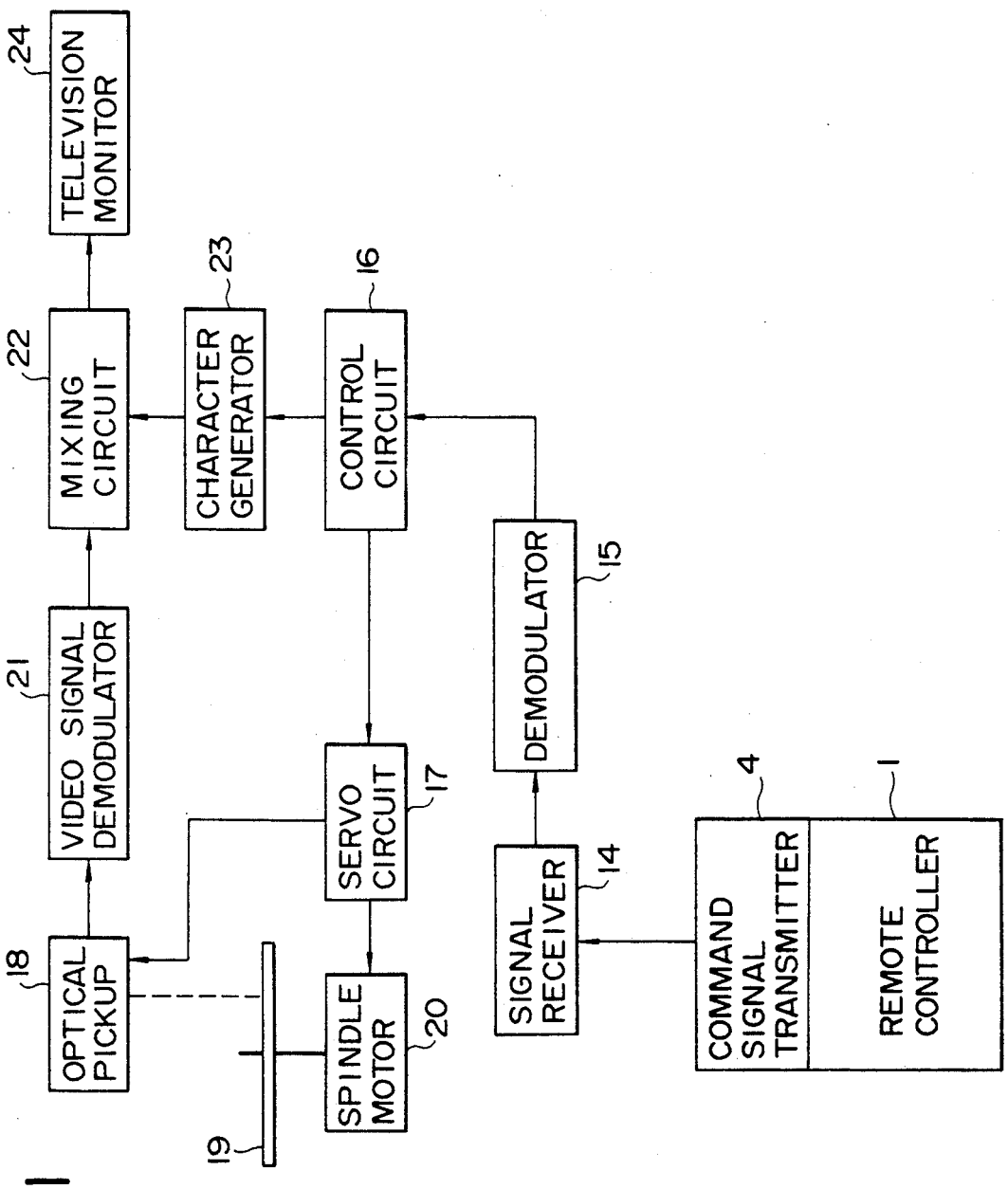
FIG. 1 is a block diagram of an index display device for a video disk player, in a preferred embodiment according to the present invention.

Referring to FIG. 1, a remote controller 1 has a command signal transmitter 4, i.e., an infrared signal transmitter. A command signal, i.e., an infrared signal, transmitted by the command signal transmitter 4 is received by a signal receiver 14, i.e., an infrared signal receiver, provided on a video disk player. The command signal received by the signal receiver 14 is demodulated and converted into a code signal by a demodulator 15. A control circuit 16, such as a microcomputer, generates control signals on the basis of the code signal and identifies the data format of the code signal.

The control circuit 16 gives a servo control signal to a servo circuit 17. If the command signal provided by the remote controller 1 is a chapter search command signal, the servo circuit 17 gives a servo signal to an optical pickup 18 to locate the optical pickup 18 at a position corresponding to a frame on a video disk 19 specified by the command signal provided by the remote controller 1. On the other hand, the servo circuit 17 gives a servo signal to a spindle motor 20 for rotating the video disk 19. A video signal demodulator 21 demodulates a RF video signal obtained by the optical pickup 18 to provide a base band signal.

The base band signal provided by the video signal demodulator 21 is fed to a mixing circuit 22. The base band signal is given to a television monitor 24 together with an index display signal provided by a character generator 23, which is controlled by the control circuit 16 in an on-off control mode.

The data format for a command signal provided by the remote controller 1 to specify the independent key operation and the bar code read operation will be described hereinafter.

Figures 2, 3:
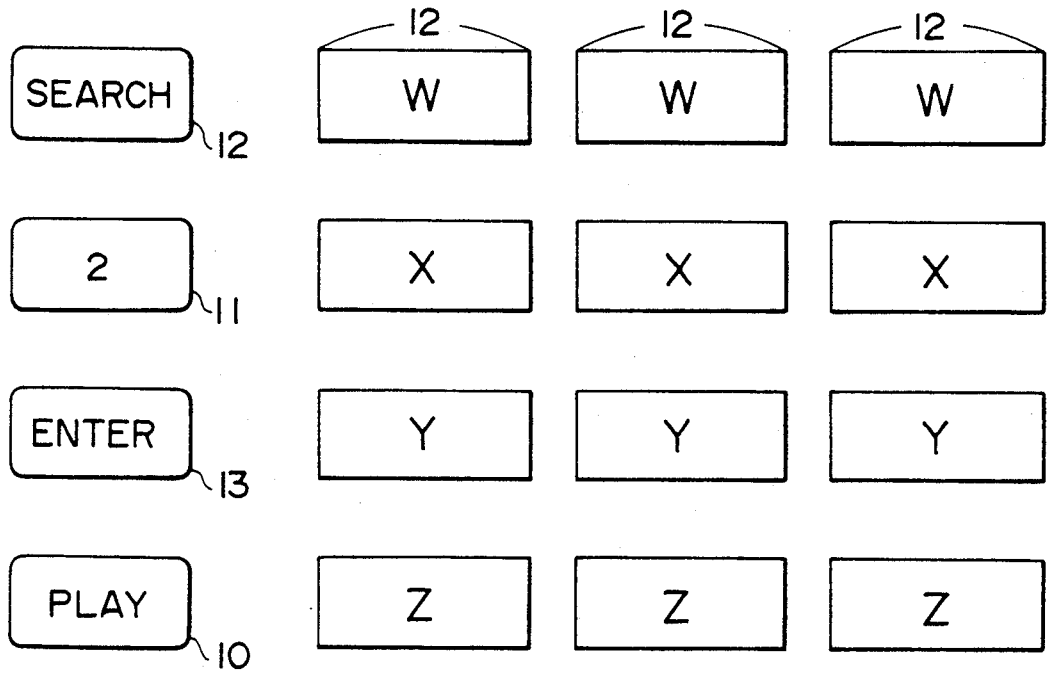
FIG. 2 is a view showing the format of data words of command signals provided by a remote controller.
FIG. 3 is a view showing the format of data strings of command signals provided by the remote controller.

FIG. 2 shows a key operating procedure for specifying search for Chapter 2 in the independent key operating mode by the remote controller 1, and the data word of command signals generated when the keys of the remote controller 1 are operated.

For example, the search key 12 of the remote controller 1 is operated, and then a first data world W of twelve bits is generated three times.

Then, the numeric key 11 for "2" is operated to generate a second data work X of twelve bits three times. Then, the enter key 13 is operated to generate a third data word Y of twelve bits. Finally, the play key 10 is operated to generate a fourth data word Z of twelve bits three times.

The data word is transmitted three times to prevent the erroneous operation of the receiver. The receiver is programmed so as to decide that the received data word is effective when two data words among the three received data words coincides.

FIG. 3 shows the contents of codes representing the data words W, X and Z shown in FIG. 2.

Each data word consists of a data code expressed by seven bits, and a category code expressed by five bits. As shown in FIG. 3, the seven-bit data codes are data row signals corresponding to the search key, the numeric key for "2", the enter key and the play key. The five-bit category codes are the same and corresponds to a video disk player.

Figures 4, 5:
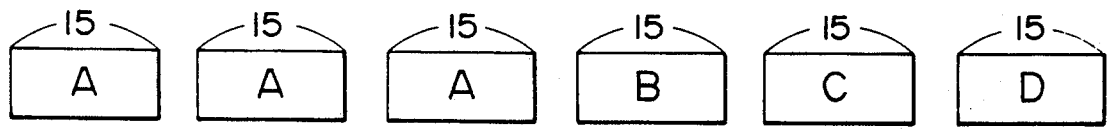
FIG. 4 is a view showing the format of data words of command signals in different modes provided by the remote controller.
FIG. 5 is a view showing the format of data strings of command signals provided by the remote controller.

FIG. 4 shows the data words of a command signal for specifying, for example, search for Chapter 2 when the remote controller 1 is operated in the bar code read mode.

In this case, a start word A consisting of fifteen bits is provided three times, a chapter reproduction command work B consisting of fifteen bits is provided once, a word C consisting of fifteen bits and representing the numeric key for "2" is provided once, and an ending word D consisting of 15 bits is provided once.

In the bar code read mode, each of the words A to D consists of a data code expressed by seven bits, and a category code expressed by eight bits as shown in FIG. 5.

Figure 6:
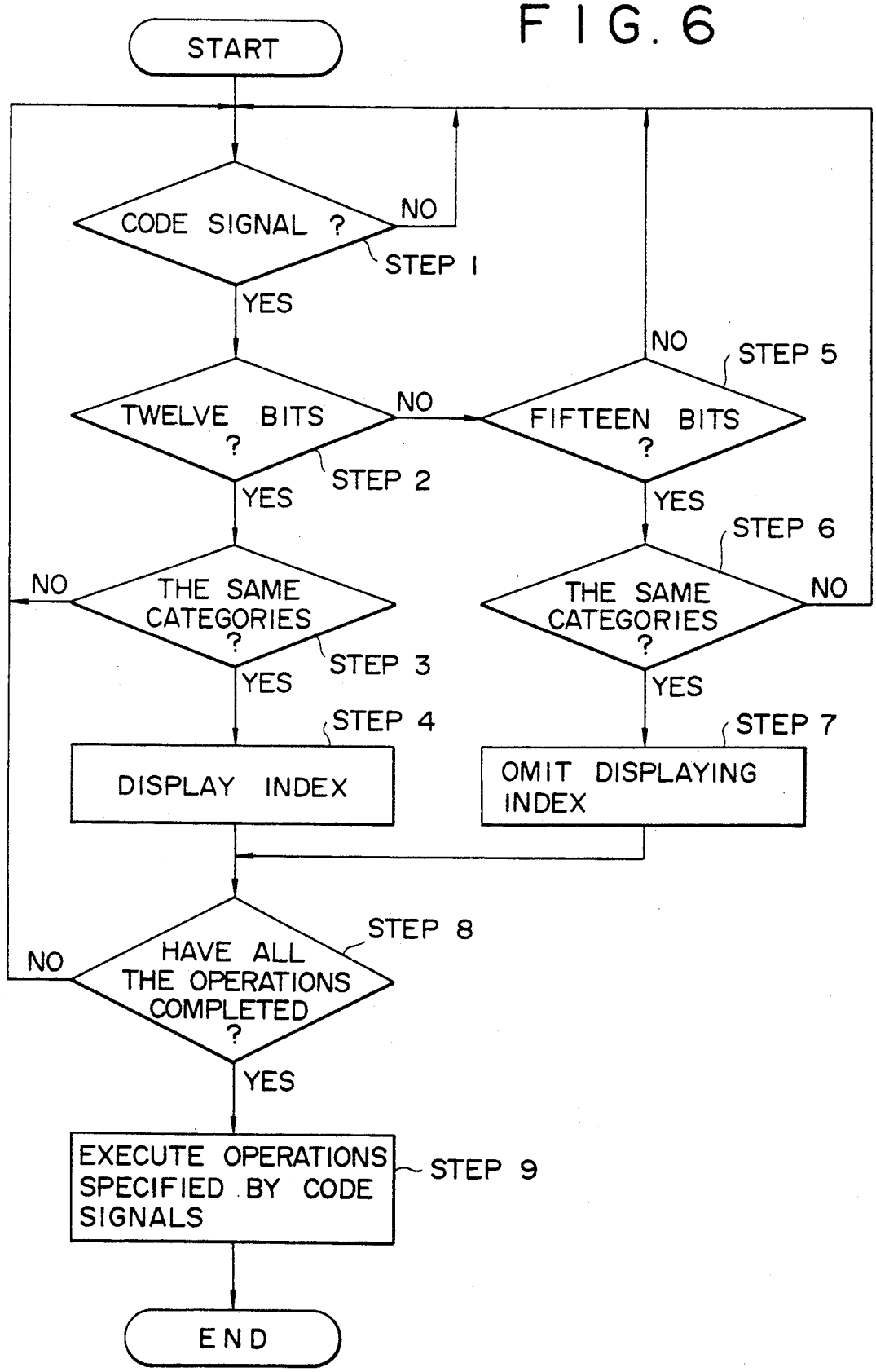
FIG. 6 is a flow chart of assistance in explaining the operation of a control circuit included in the index display device of FIG. 1.
Figure 7:
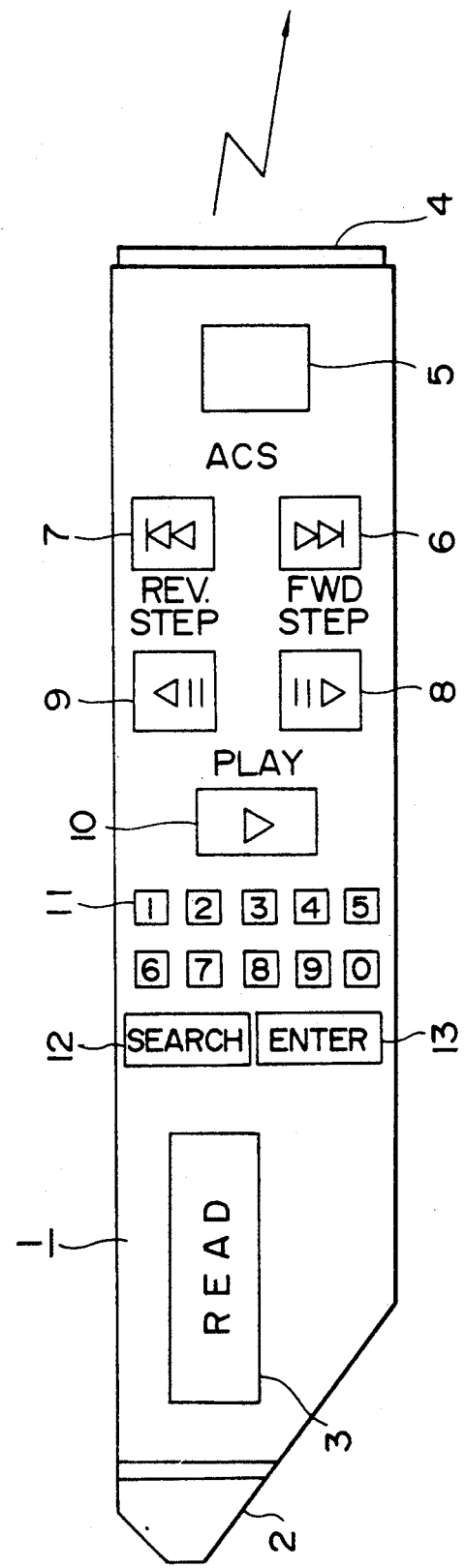
FIG. 7 is a plan view of a remote controller.
Figure 8A:
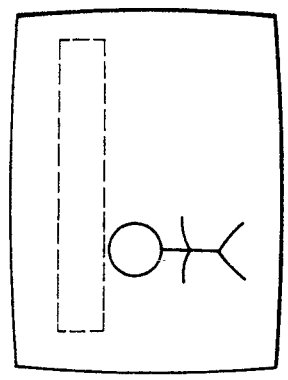
FIGS. 8(A), 8(B), 8(C) and 8(D) are front views of the screen of a monitor displaying indices.
Figure 8B:
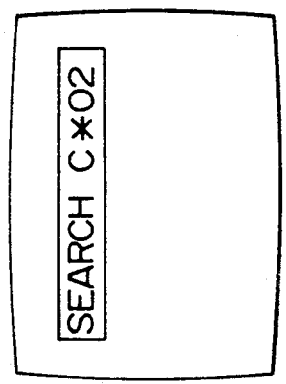
Figure 8C:
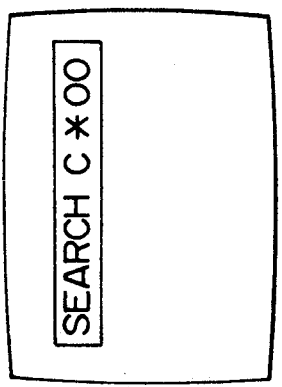
Figure 8D:
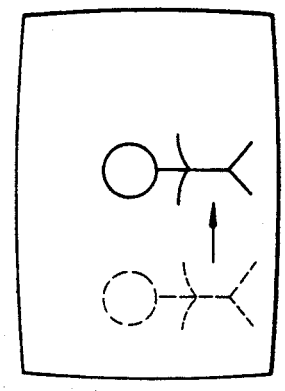

FIG. 6 shows a flow chart of a program for deciding whether the command signal is given by the remote controller in the independent key operation mode or whether the same command signal is given in the bar code read mode and for controlling index display operation, to be executed by the control circuit 16 of the video disk player shown in FIG. 1.

A query is made in step 1 to see if the output signal of the demodulator 15 includes a code signal. If the response in step 1 is affirmative, a query is made in step 2 to see if the number of bits of each word is twelve. If the response in step 2 is affirmative, it is decided that the output signal is a command signal provided in the independent key mode, and then the five-bit category codes are compared to see if all the categories are the same.

If the decision in step 3 is affirmative, an index display signal is provided in step 4.

If the response in step 2 is negative, namely, if the number of bits of each word is not equal to twelve, a query is made in step 5 to see if the number of bits of each word is fifteen.

If the response in step 5 is affirmative, it is decided that the command signal is provided in the bar code read mode, and then a query is made in step 5 to see of all the categories are the same.

If the response instep 6 is affirmative, an index omission signal is provided in step 7.

If step 4 is executed, the control circuit 16 shown in FIG. 1 gives an index display control signal to the character generator 23, an index signal provided by the character generator 23 is mixed with the output signal of the video signal demodulator 21 by the mixing circuit 22, and the output signal of the mixing circuit 22 is displayed on the television monitor 24. If step 7 is executed, the controller 16 shown in FIG. 1 gives an index omission control signal to the character generator 23, and the character generator 23 does not generate any index signal and hence no index is displayed on the television monitor 24.

After step 4 or step 7 has been executed, a query is made in step 8 to see if a series of operations represented by the command data has been completed. If the response in step 8 is affirmative, a series of operations represented by the code signals, such as an operation for searching Chapter 2 and an operation to start the play mode, is executed in step 9.

Identification codes included in the command signals provided by the remote controller may be used instead of the number of bits for identifying the independent key operation mode and the bar code read mode.

Although the invention has been described in its preferred form with a certain degree of particularity, obviously many changes and variations may be made therein. It is therefore to be understood that the present invention may be practiced otherwise than as specifically described herein without departing from the scope and spirit thereof.

What is claimed is:
1. An index displaying device for a video disk player, comprising:
   a signal receiver for receiving a signal transmitted by a remote controller;
   an index generating circuit for generating an index signal corresponding to the signal received by the signal receiver to be displayed together with video signals reproduced from a video disk; and
   a control circuit for deciding if the signal received by the signal receiver is produced by reading a bar code by the remote controller, and providing an index display omission command signal requiring an omission of displaying an index when the signal received by the signal receiver is produced by reading the bar code or an index display command signal requiring the display of an index when the signal received by the signal receiver is produced by operating the keys of the remote controller.

* * * * *